INVENTOR.
BERNARD KEITH BETZ
BY Fred Jacob
ATTORNEY

INVENTOR.
BERNARD KEITH BETZ
BY Fred Jacob
ATTORNEY

United States Patent Office 3,248,709

Patented Apr. 26, 1966

3,248,709

ELECTRICAL DATA HANDLING APPARATUS INCLUDING SELECTIVE SUBSTITUTION OF ADDRESSABLE INPUT/OUTPUT DEVICES

Bernard Keith Betz, Hopkins, Minn., assignor to Honeywell Inc., a corporation of Delaware Filed Nov. 6, 1962, Ser. No. 235,759
7 Claims. (Cl. 340—172.5)

The present invention relates in general to new and improved data handling apparatus and in particular to apparatus for transferring data to and from a plurality of input/output devices associated with a computer system.

Present-day computers generally have a number of input/output devices associated therewith. Different types of input/output devices, such as tape drives, paper tape punches, magnetic drums, printers, etc. are necessary in accordance with the form in which the output data is utilized. The use of more than one input/output device of a particular type is made possible by the speed with which computations are carried out by the data processor, which generally far exceeds the speed of data handling by the input/output devices.

Ordinarily, the data handled or to be handled by a given input/output device is stored in a specified section of the computer memory assigned thereto in accordance with a predetermined program. The transfer of data between each memory section and the outside world then occurs only by way of the corresponding input/output device. Each input/output device is designated by its own address code which forms a part of each order directed to the device.

An input/output device may be out of commission as a result of a mechanical breakdown due to the constant demands made on it by the operation of the computer. Such a device may also be time-shared and hence unavailable at a given time. On occasion, the use of the assigned input/output device, although it is available, may not be the most convenient or fastest way to handle a particular situation. For example, a "working tape" which is to be used for scratch-pad purposes may, due to a previous run, be in position on a tape drive which was not programmed for the present run. If the latter tape drive is not otherwise programmed for use, it is preferable and less time-consuming to leave the tape in position, provided it can be thus addressed, than to set it up on the originally programmed tape drive.

Where these situations are foreseeable and an equivalent input/output device is available, proper programming may be used so that all the orders originating in the aforesaid memory section are addressed to the device which is available or convenient. In many cases, however, a substitution must be effected on short notice without resort to changes in the previously written programs. In the past, such schemes were carried out by a plugboarding technique, whereby the data directed to the unavailable input/output device was fed to a substitute device by way of a mechanical plugging device similar to that employed in a telephone switchboard. This technique is time-consuming since it requires mechanical setup time on the part of the computer operator who must leave the console where he is stationed to carry out the necessary changes on the plugboard. Moreover, with this method the possibility of error is relatively high.

A refinement on the plugboarding technique has been in use for some time. A dial is arranged so that an input/output device may be matched to a memory section by means of the proper dial setting. Although the chance of error is reduced with this method as compared to the mechanical plugboarding technique, it is otherwise subject to the same objections as the latter. Another objection, which likewise applies to the plugboarding technique, is the chance of mechanical failure which further detracts from the reliability of such devices.

It is the primary object of the present invention to provide new and improved data handling apparatus which overcomes the foregoing disadvantages.

It is another object of the present invention to provide data handling apparatus wherein the substitution of input/output devices does not require any mechanical setup time on the part of the operator.

It is a further object of the present invention to provide data handling apparatus wherein the selective substitution of input/output devices is effected wholly by electronic means within the framework of an existing program.

The foregoing objects are attained in the present invention by providing apparatus for establishing a table of substitutions in the memory portion of the computer, the contents of which may be selectively changed in accordance with the dictates of a particular situation. Each order that is directed to a particular input/ouput device first consults the table of substitutions in the computer memory to obtain a substitute address code, i.e. the address code of the actual input/output device which will handle the order. The latter may be identical with the address code of the device to which the order was originally directed, or it may be that of a substitute device. In either case, the address code so obtained is substituted for that included in the order itself and is used to address the corresponding input/output device for the execution of the order.

These and other novel features of the invention together with further objects and advantages thereof will become apparent from the following detailed specification with reference to the accompanying drawing, in which.

Figure 1:
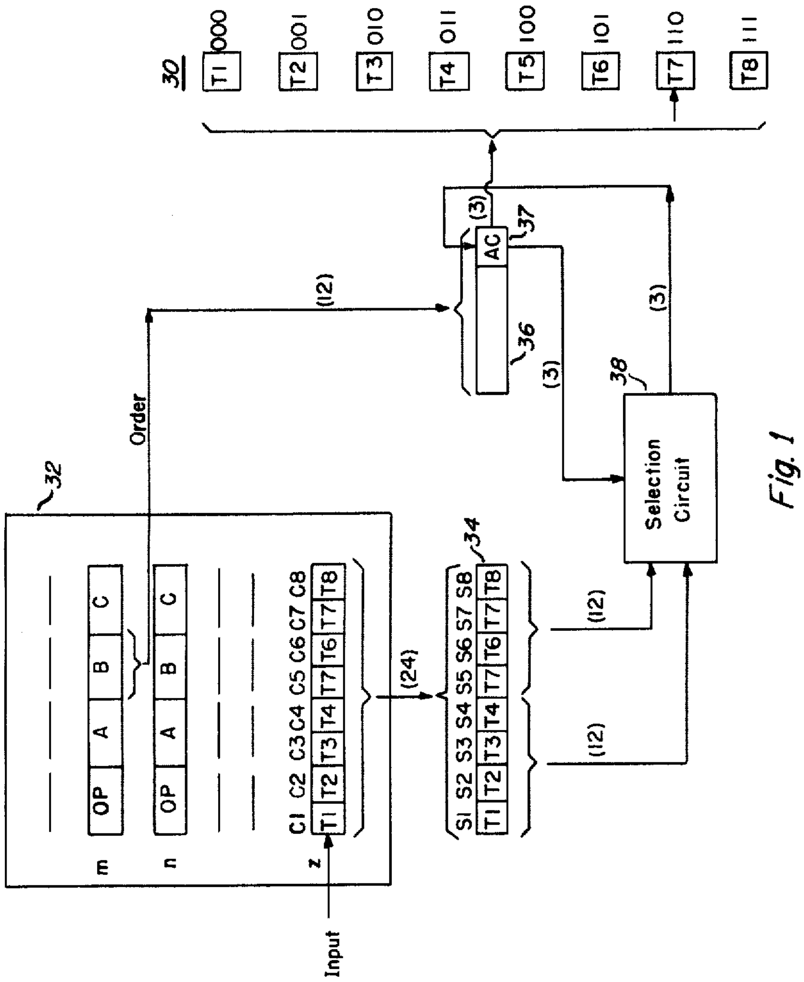
FIGURE 1 illustrates a preferred embodiment of the invention.

With reference now to FIGURE 1 of the drawing, the reference numeral 30 designates a pulrality of substantially identical input/output devices which consist of eight separate tape drives T1–T8 in the illustrated embodiment of the invention. Each tape drive has its own address code, as represented by the three-digit number adjacent thereto in the drawing. The memory storage associated with the computer is shown at 32 and may consist of a coincident current core memory having rectangular hysteresis cores. Representative memory locations *m*, *n* and *z* are illustrated, different portion of which each have their own address, such as the addresses A, B and C.

A command stored in the memory 32 will contain an operating code, an address or addresses and sometimes additional information. Operating codes, requiring the execution of an operation, are stored in the memory locations *m* and *n*. For example, the operation indicated by the letters OP in the memory location *m* may require that information be taken from the address A and be added to the information at address B, the sum to be transferred to the address C. For the execution of such an order it is necessary that the various data parts required first be obtained from their respective portions of the memory location.

For the sake of the present discussion, the address B will be assumed to refer to tape drives only, the order related to that address requiring either the reading or writing of information on tape, or the rewinding of the tape which is located on the particular tape drive that is being addressed. In the present example, the address B is assumed to hold twelve binary digits, three of which are devoted to the storage of the address code.

The location $z$ of the memory 32 is seen to comprise eight memory cells C1–C8. The contents of the memory cells C1–C8 are externally derived through the input shown, each cell being selectively adapted to store three binary digits. A 24-line path, as indicated by the number in parentheses in the drawing, couples the eight memory cells at the location $z$ to an external register 34. The latter is divided into eight sections S1–S8, corresponding respectively to the memory cells C1–C8. Each register section is capable of storing three binary digits by the use of suitable bistable storage means such as, for example, three flip-flop circuits.

A register 36 which is capable of holding twelve binary digits, e.g. by using twelve flip-flops similar to those of the register 34, is coupled to the B portion of the memory location $m$ by a 12-line path. A portion of the register 36, labeled 37 in the drawing, is adapted to contain a three-digit address code AC and is coupled to a selection circuit 38 to provide an input thereto. The selection circuit receives a further input from the register 34 by way of two separate paths, one adapted to transfer the twelve bits stored in the sections S1–S4 and the other adapted to transfer the twelve bits stored in S5–S8. The output of the section circuit consists of a three-line path which is coupled back to the address code portion 37 of the register 36. An additional three-line path couples the address code portion 37 to the tape drives T1–T8.

Figure 2:
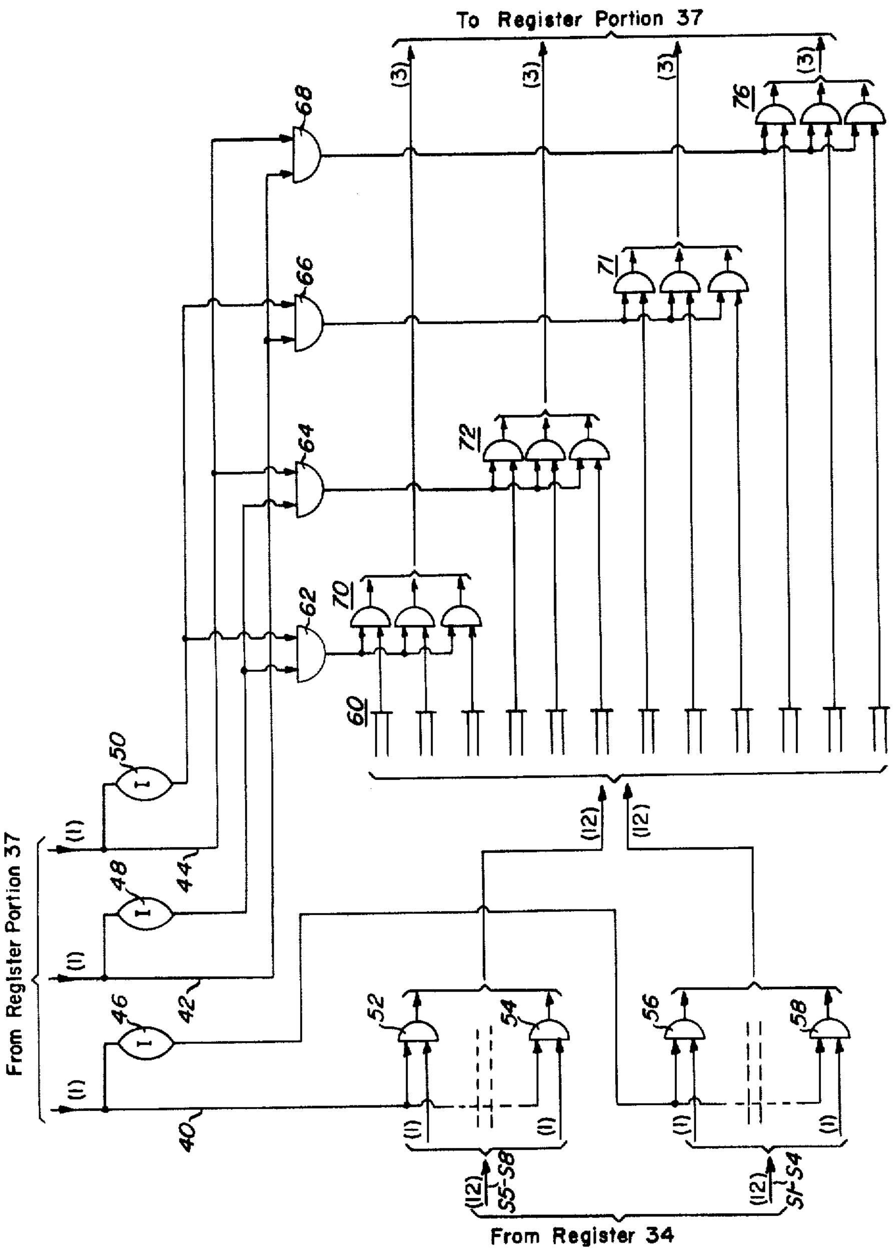
FIGURE 2 illustrates in greater detail one embodiment of a logical gating arrangement for the selection circuit of FIGURE 1.

FIGURE 2 illustrates in greater detail one embodiment of the logical gating circuitry in the selection circuit 38. The three signal lines 40, 42 and 44 from the portion 37 of the register 36 are connected to inverters 46, 48 and 50 respectively, in order to provide direct as well as inverted signals. Each of the 24 signal lines from the register 34 is applied to a two-legged gate. For the sake of clarity, only the gates 52 and 54 are illustrated for the twelve-line path which represents the output of the sections S5–S8 of the register 34, it being understood that the remaining ten gates are connected in identical fashion. Likewise, only the gates 56 and 58 are shown for the twelve-line path which constitutes the output of the register sections S1–S4. The gates 52–54 each receive a further input from the direct signal line 40, while the gates 56–58 each receive a second input from the output of the inverter 46. The twelve outputs from the gates 52–54 are paired with corresponding ones of the twelve outputs from the gates 56–58, each of said pairs being buffered together by one of the buffers 60. The latter are arranged in four sets of three buffers each, corresponding respectively to four gate sets 70, 72, 74 and 76, each containing three gates.

A set of gates 62, 64, 66 and 68 is provided, each gate having a pair of inputs. The direct signal line 42 is connected to one input of each of the gates 66 and 68. The direct signal line 44 is connected to each of gates 64 and 68. The output of the inverter 48 is connected to the gates 62 and 64 respectively, while the output of the inverter 50 is connected to the gates 62 and 66.

The output of the gate 42 is coupled to one input of each gate of the aforesaid gate set 70. The other input of each of the gates 70 is connected to the output of one of the buffers 60 which corresponds thereto. In similar manner the gates 72, 74 and 76 each have one input leg connected to the output of the gates 64, 66 and 68 respectively, the other input leg being connected to a corresponding buffer. Since in each case a buffer set corresponds to a set of gates, the output of a gate set represents the information previously stored in one of the register sections S1–S8.

FIGURE 2 is limited to one embodiment of the logical gating circuitry of the selection circuit 38. In actual practice, the latter may further include output registers to transfer data to or from the selection circuit. Since these are not required for an understanding of the present invention, they have not been illustrated in order to simplify the explanation.

For the purpose of explaining the operation of the present invention, let it be assumed that the twelve-bit order stored at the B address constitutes a portion of the total command in the memory location $m$ and is directed to the tape drive T5. As such, the order includes the three-digit address code 100 which is representative of the tape drive T5. Let it be further assumed that the tape drive T5 is unavailable because of mechanical failure and that the tape drive T7 is to be substituted therefor. All other tape drives are assumed to be available. The tape drive T7 is to be additionally used for its ordinarily intended duties which, because they make use of this tape drive at a different time, are assumed not to interfere with its function as a substitute for T5.

As previously explained, if the condition of the tape drive T5 were known in advance, it would of course be possible to program accordingly, i.e. to address the particular order under consideration to the tape drive T7. Under ordinary circumstances, however, the mechanical failure of a tape drive occurs on relatively short notice so that correction by program rewriting is precluded in the present case.

The data stored in the memory cells C1–C8 may be supplied by a console operator through the input shown in the drawing and constitutes the address codes of the tape drives selected by programming for the execution of the various orders. In the present example, it is assumed that the address codes of the tape drives T1–T8 were originally stored in the memory cells C1–C8 respectively. Inasmuch as the tape drive T5 alone of all the tape drives is unavailable, only the contents of the memory cell C5 are changed. This is done by entering the address code of the tap drive T7 in place of the address code of T5 stored there. The address codes in the remaining memory cells need not be changed.

The particular order which is stored at the B address is transferred out by way of the aforesaid twelve-line path and is entered into the register 36. The contents of the memory cells C1–C8 are then transferred to their corresponding sections S1–S8 in the register 34. Although the transfer of data from the register 34 to the selection circuit 38 may occur by way of two separate twelve-line paths, the selection circuit 38 is capable of accepting only one of the two twelve-bit sets of data at a time. The selection is carried out in accordance with the first bit of the order address code in the portion 37 of the register 36. In the example under consideration, this code is 100 and hence the first binary digit is 1 and appears on the line 40 in FIGURE 2. Accordingly, the gates 52–54 will pass the contents of the sections S5–S8 to the buffers 60. Conversely, the output of the inverter 46 which is 0 in the present case, will keep the gates 56–58 closed.

The selection of one address code from the four codes transferred to the buffers 60 is carried out in accordance with the last two digits of the order address code in the register 34. In the example under consideration, these digits are 00 and accordingly the output of each of the inverters 48 and 50 will be active. The resultant output signal of the gate 62 is applied to the gates 70, which responds by transferring the three-bit code received from the first set of buffers out of the selection circuit. Thus, the address code 110 of the tape drive T7, which was previously stored in S5, is transferred to the register portion 377 where it activates the appropriate flip-flops so that the code 110 is substituted for the order address code 100. The substituted order address code 110 now residing in the register portion 37 is employed to address the tape drives. As a consequence, the tape drive T7 is selected for the execution of the order stored at the address B.

It will be clear from the foregoing explanation that the invention is not limited to tape drives but is applicable to any system wherein a plurality of equivalent interchangeable addressable input/output devices are employed. Moreover, any number of input/output devices may be used, provided only that the associated address codes are capable of uniquely identifying them. As previously explained, the selection circuit 38 need not consist of a gating circuit, such as shown in FIGURE 2. Various alternative techniques, such as magnetic switching, may be employed.

In place of rectangular hysteresis cores the memory 32 may employ other bistable devices, each capable of storing a single binary digit. Similarly, the invention is not limited to the use of flip-flops in the registers 34 and 36. Bistable cores could be substituted or, alternatively, each register could consist of regeneratively connected amplifiers, each adapted to store a single bit by recirculation.

In the illustrated embodiment of the invention, the selection of one of the address codes stored in the register 34 occurs in two stages. This is done for the sake of convenience only since the selection circuit, due to considerations beyond the scope of this explanation, is limited to accepting twelve binary digits at a time. In actual practice, the diode gating circuitry may be extended to make a one-step selection of the address codes residing in the register 34.

From the foregoing disclosure of the invention, it will be apparent that numerous modifications, changes and equivalents will now occur to those skilled in the art, all of which fall within the true spirit and scope contemplated by the invention.

What is claimed is:

1. A data handling system comprising a plurality of input/output devices each addressable by a separate address code, a memory including means for storing orders which are directed to said input/output devices by means of said address codes, said memory further including a plurality of cells each corresponding to a selectively predetermined one of said input/output devices, means for storing a selected address code in each of said cells, first and second registers, means for transferring an order chosen for execution from said memory to said first register, means for transferring said selected address codes stored in all of said cells to said second register, means responsive to the address code of the order stored in said first register to extract one of said selected address codes in said second register, means for substituting said extracted selected address code for the order address code stored in said first register, and means for addressing said input/output devices with said substituted address code for the execution of said order by one of said devices corresponding to said last-recited code.

2. In a data handling system of the kind having a plurality of input/output devices each identified by its own address code, the combination comprising storage means responsive to each of said address codes to provide a substitute address code, means for receiving orders which are directed to said input/output devices through address codes included in said orders, means responsive to said order address codes to derive substitute codes from said storage means, and means for addressing said input/output devices with said substitute address codes provided by said storage means.

3. In a data handling system of the kind having a plurality of input/output devices each addressable by its own address code, the combination comprising first storage means including separate sections respectively corresponding to predetermined ones of said input/output devices and being addressable by the address codes of the latter, means for storing a selected one of said address codes in each of said sections, second storage means for storing orders which are directed to said input/output devices through address codes included in said orders, means responsive to the address code of a stored order to extract from the corresponding section of said first storage means the selected address code stored therein, and means for addressing the input output device which corresponds to said extracted selected address code.

4. A data handling system comprising a plurality of input/output devices each addressable by a separate address code, a memory adapted to store orders which are directed to said input/output devices by means of said address codes, said memory further including a plurality of cells each corresponding to a predetermined one of said input/output devices, means for storing a selected address code in each of said cells, a first register, means for transferring an order chosen for execution from said memory to said first register, a second register having a plurality of sections each corresponding to a predetermined one of said input/output devices, means for transferring an order chosen for execution from said memory to said first register, means for transferring said selected address codes stored in said cells to said second register, means for extracting the selected address code stored in a section of said second register which corresponds to said order address code, means for substituting said selected address code for the order address code in said first register, and means for addressing said input/output devices from said first register for the execution of said order by the input/output device which corresponds to said substituted selected address code.

5. A data handling system comprising a plurality of tape drives each adapted to transport a magnetic storage tape, each of said tape drives being addressable by a separate address code, a memory having a plurality of storage locations adapted to store orders which are directed to said tape drives by means of said address codes, said memory further including a storage location containing a plurality of storage cells each corresponding to a predetermined one of said tape drives, means for storing a selected address code in each of said cells, a first register, means for transferring an order chosen for execution from said memory to said first register, a second register divided into a plurality of sections each corresponding to one of said cells and to its related tape drive, means for transferring the contents of said memory cells to said second register, means responsive to the address code of the order stored in said first register to extract from the corresponding section of said second register the selected address code stored therein, means for substituting said last-recited selected address code for the order address code residing in said first register, and means for addressing a tape drive corresponding to said substituted selected address code in said first register for the execution of said order.

6. A data handling system comprising a plurality of tape drives each adapted to transport a magnetic storage tape, each of said tape drives being addressable by a separate address code, a memory having a plurality of storage locations adapted to store orders which are directed to said tape drives by the inclusion of said address codes, said memory further including a storage location containing a plurality of storage cells each corresponding to a predetermined one of said tape drives, means for storing a selected address code in each of said cells, a first register, means for transferring an order chosen for execution from said memory to said first register, a second register divided into a plurality of sections each corresponding to one of said cells and identifiable by the address code of the tape drive corresponding to said cell, means for transferring the contents of said memory cells to the corresponding sections of said second register, a selection circuit connected to extract the contents of one section of said second register selected in accordance with the address code of the order stored in said first register, and means for substituting said extracted contents of said selected register section for the order address code in said first register to address the tape drive corresponding thereto for the execution of said order.

7. A data handling system comprising a plurality of tape drives each adapted to transport a magnetic storage tape, each of said tape drives being addressable by a separate three-digit address code, a memory having a plurality of storage locations adapted to store orders which include said address codes and which are directed to said tape drives, said memory further including a storage location containing a plurality of storage cells each corresponding to one of said tape drives, means for storing a selected address code in each of said cells, a first register, means for transferring an order chosen for execution from said memory to said first register, a second register divided into a plurality of sections each corresponding to one of said cells and identifiable by the address code of the corresponding tape drive, means for transferring the contents of said memory cells to the corresponding sections of said second register, said plurality of second register sections forming two groups, a selection circuit including first gating means responsive to one digit of the address code of the order in said first register for accepting the address codes stored in one of said groups of register sections, second gating means responsive to the remaining two digits in the order address code in said first register for extracting one address code from said accepted group of address codes, means for substituting said extracted address code for the order address code in said first register, and means for addressing one of said tape drives which corresponds to said substituted address code for the execution of said order.

No references cited.

ROBERT C. BAILEY, *Primary Examiner.*

P. J. HENON, *Assistant Examiner.*